(12) United States Patent
Martin et al.

(10) Patent No.: US 9,748,825 B2
(45) Date of Patent: Aug. 29, 2017

(54) TOOL FOR INSTALLING A WEDGE IN A SLOT OF A STATOR CORE

(71) Applicant: Siemens Energy, Inc., Orlando, FL (US)

(72) Inventors: Chelsey Martin, Charlotte, NC (US); William G. Stevens, York, SC (US); James Long, Jr., Mount Holly, NC (US)

(73) Assignee: SIEMENS ENERGY, INC., Orlando, FL (US)

( * ) Notice: Subject to any disclaimer, the term of this patent is extended or adjusted under 35 U.S.C. 154(b) by 224 days.

(21) Appl. No.: 14/644,292

(22) Filed: Mar. 11, 2015

(65) Prior Publication Data

US 2016/0268878 A1  Sep. 15, 2016

(51) Int. Cl.
| | |
|---|---|
| H02K 15/00 | (2006.01) |
| H02K 15/14 | (2006.01) |
| H02K 15/16 | (2006.01) |
| B25B 27/02 | (2006.01) |
| H02K 3/487 | (2006.01) |

(52) U.S. Cl.
CPC ....... *H02K 15/0018* (2013.01); *B25B 27/026* (2013.01); *H02K 3/487* (2013.01)

(58) Field of Classification Search
CPC ... H02K 15/0018; H02K 3/487; B25B 27/026
See application file for complete search history.

(56) References Cited

U.S. PATENT DOCUMENTS

| | | | | | |
|---|---|---|---|---|---|
| 3,888,638 | A | * | 6/1975 | Walker | H02K 15/10 29/734 |
| 4,347,657 | A | * | 9/1982 | Barrera | H02K 15/068 29/596 |
| 4,455,743 | A | * | 6/1984 | Witwer | H02K 15/0037 29/564.1 |
| 4,594,771 | A | * | 6/1986 | Appenzeller | H02K 15/0018 29/407.01 |
| 5,075,959 | A | * | 12/1991 | Keck | H02K 15/0006 29/267 |

(Continued)

FOREIGN PATENT DOCUMENTS

| | | |
|---|---|---|
| JP | 09009586 A | 1/1997 |
| JP | 2006166675 A | 6/2006 |

OTHER PUBLICATIONS

PCT International Search Report and Written Opinion mailed May 19, 2016 corresponding to PCT Application No. PCT/US2016/017987 filed Feb. 16, 2016 (13 pages).

*Primary Examiner* — Paul D Kim

(57) ABSTRACT

A tool (110) is presented for installing a wedge (104) in a slot (101) of a stator core (100). The tool (110) includes a housing (112) and a shaft (128) extending axially from the housing. An end of the shaft (128) is positioned in the slot (101) on a first side of the wedge (104) to engage a wedge surface (118). The tool (110) further includes a pump (120) operatively coupled to the shaft (128) to actuate the shaft in an axial direction (122) external to the housing (112) to install the wedge in the slot. The tool (110) further includes a tongue (124) inserted in a vent gap (126) of the slot (101) on the first side of the wedge to brace the tool against the slot during the installation of the wedge. A system (200) and method (300) are also presented for installing the wedge.

18 Claims, 12 Drawing Sheets

(56) References Cited

U.S. PATENT DOCUMENTS

| | | | |
|---|---|---|---|
| 5,090,114 A | 2/1992 | Walker et al. | |
| 6,584,680 B2 | 7/2003 | Iversen | |
| 6,708,395 B2 | 3/2004 | Pezzano | |
| 7,707,710 B2 | 5/2010 | Lape | |
| 7,743,675 B2 | 6/2010 | Moore | |
| 8,987,970 B2 * | 3/2015 | Uchida | H02K 3/487 310/214 |
| 2009/0031557 A1 | 2/2009 | Lape et al. | |
| 2010/0154201 A1 | 6/2010 | Pervaiz | |

* cited by examiner

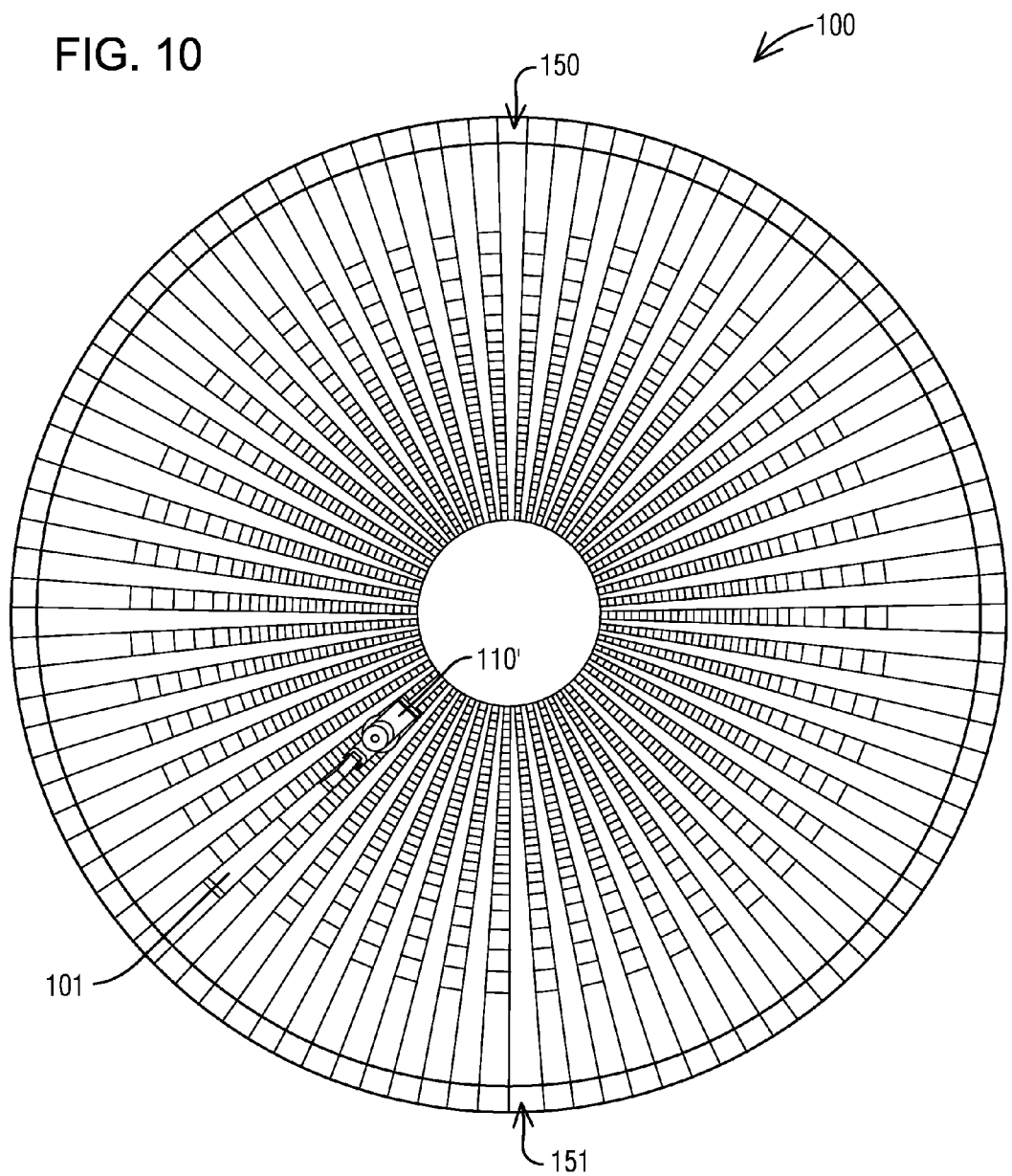

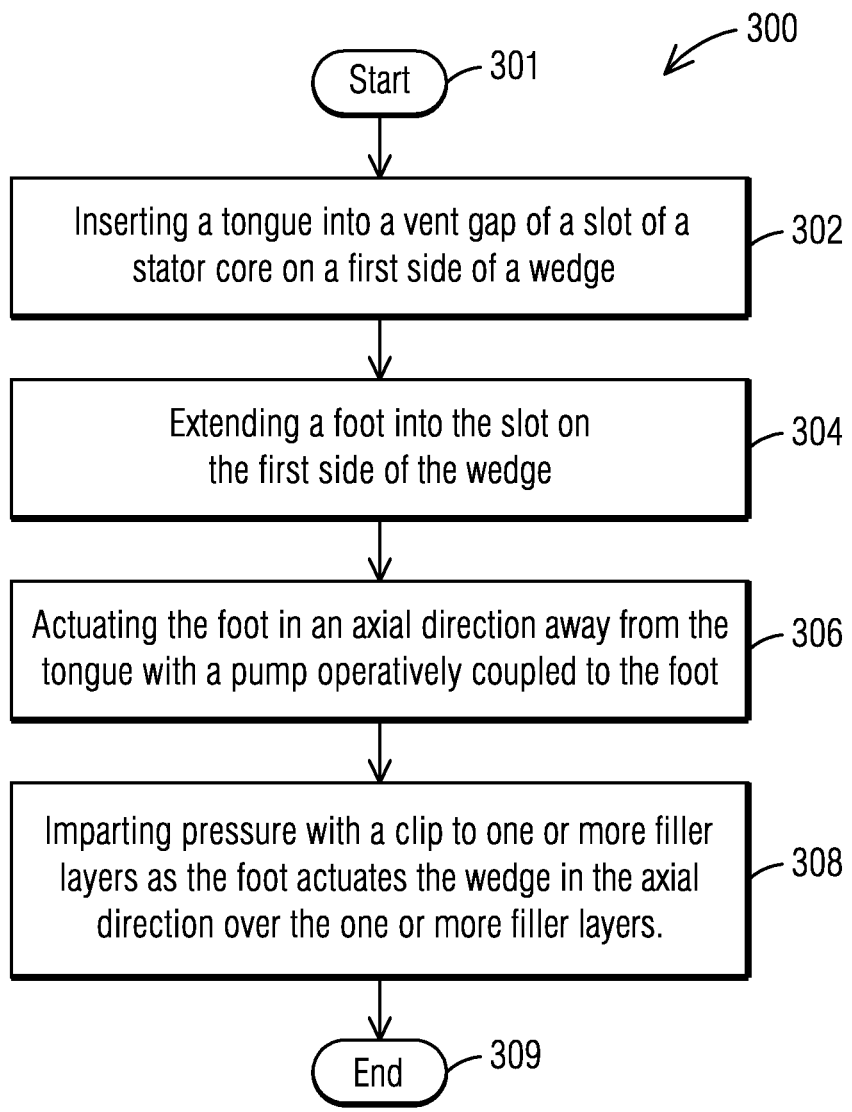

TOOL FOR INSTALLING A WEDGE IN A SLOT OF A STATOR CORE

FIELD OF THE INVENTION

The invention relates to dynamoelectric machines such as generators, and more particularly to a tool for installing a wedge in a slot of a stator core in a generator.

BACKGROUND OF THE INVENTION

Dynamoelectric machines, such as generators, typically employ a stator core comprised of an array of axially extending circumferentially spaced slots formed in a radial inner surface of the stator core. FIG. 1 illustrates a slot 11 in a stator core 10, with coils 12 seated within the slot 11 and held in place by a stator wedge 14, a prestress driving strip (PSDS) 16, and one or more filler layers 18, 20. These support components are employed in order to maintain the coils 12 in a radially tight condition within the slot 10. The coils 12 operate under continuous strain of electromagnetic forces and thus are contained within the slot 10 to prevent insulation damage caused by relative movement between the coils 12 and the stator core 10. The wedge 14, PSDS 16, and filler layers 18, 20 impose radial forces on the coils 12 to aid the coils 12 in resisting magnetic and electrically induced radial forces.

Prior to installing the stator wedge 14 in the slot 11, the PSDS 16 and filler layers 18, 20 are initially positioned over the coils 12. The wedge 14 is then slid over the PSDS 16 and filler layers 18, 20, to test the tightness of the wedge 14. Based on the tightness of the wedge 14, one or more of the PSDS 16 and filler layers 18, 20 may be removed or added, until a desired tightness of the wedge 14 is achieved. For example, if the wedge 14 is too tight and cannot be slid over the PSDS 16 and filler layers 18, 20, the PSDS 16 may be removed. In another example, if the wedge 14 is not sufficiently tight, an additional filler layer may be added. In an example, the wedge 14 is a check wedge with a plurality of openings to insert a device for measuring tightness at each opening and an average of the measured tightness across the openings is used to determine the wedge 14 tightness.

After the desired tightness of the wedge 14 is achieved, the wedge 14 is installed by driving the wedge 14 along axial slots 15 and over the PSDS 16 and filler layers 18, 20. Conventional methods for driving the wedge 14 involve manually providing the force required to install the wedge 14. For example, FIG. 2A illustrates a block 22 and a mallet 24 to manually install the stator wedge 14 in the slot 11 of the stator core 10. The block 22 includes a recess 26 on one end and an angled portion 28 on an opposite end. FIG. 2B depicts that during installation of a wedge 14 into the slot 11, the recess 26 is positioned to engage one end of the wedge 14 within the slot 11, while the angled portion 28 is struck by the mallet 24 to axially drive the wedge 14 over the PSDS 16 and filler layers 18, 20. A clip 30 is used to apply pressure on the PSDS 16 and filler layers 18, 20, to prevent the PSDS 16 and filler layers 18, 20 from bowing up, as the wedge 14 is driven over the PSDS 16 and filler layers 18, 20.

In addition to the manual method discussed above for driving wedges over the PSDS and filler layers in stator core slots, powered tools have been developed for driving filler layers under installed wedges in stator core slots, such as in U.S. Pat. No. 7,707,710 to Lape. As depicted in FIGS. 5 and 7 of Lape, the tool housing is positioned over an installation location, where a foot pulls a filler layer under an installed wedge. As the foot pulls the filler layer under the installed wedge, the tool housing presses down on the installed wedge, to reduce radial vibrations of the filler layer, as it is driven under the installed wedge.

BRIEF DESCRIPTION OF THE DRAWINGS

The invention is explained in the following description in view of the drawings that show:

FIG. 10 is an axial end view of the tool of FIG. 9 within a slot of a lower portion of the stator core;

FIG. 13 is a flowchart depicting a method for installing a plurality of wedges in the slots of a stator core.

DETAILED DESCRIPTION OF THE INVENTION

Based on the above-discussed conventional method for installing wedges in a stator slot, the inventors recognized that the conventional method of using the block and the mallet to manually drive each wedge into the slot is time consuming, requiring an average installation time of approximately 20 seconds per wedge. In one example, the stator core has approximately 48-54 slots and 35 wedges per slot, which amounts to a total installation time of approximately 10 hours for all wedges in the stator core. Thus, the inventors recognized that it would be advantageous to provide a tool for installing wedges in the stator slot with a reduced installation time per wedge, such as approximately 7 seconds, for example. This would reduce the total installation time for all wedges in the stator core from approximately 10 hours to approximately 3 and a half hours, for example.

Additionally, the inventors recognized that the conventional method of manually striking the block with the mallet to drive in each wedge causes fatigue to the worker and may cause damage to the stator core, if the worker misses the block with the mallet and accidentally strikes the stator core forming the slot. Thus, the inventors recognized that it would be advantageous to provide a tool for automatically installing wedges in the stator slot, which applies a uniform axial force within the slot to the wedge, thereby eliminating the inherent drawbacks of the conventional method.

Figure 2A:
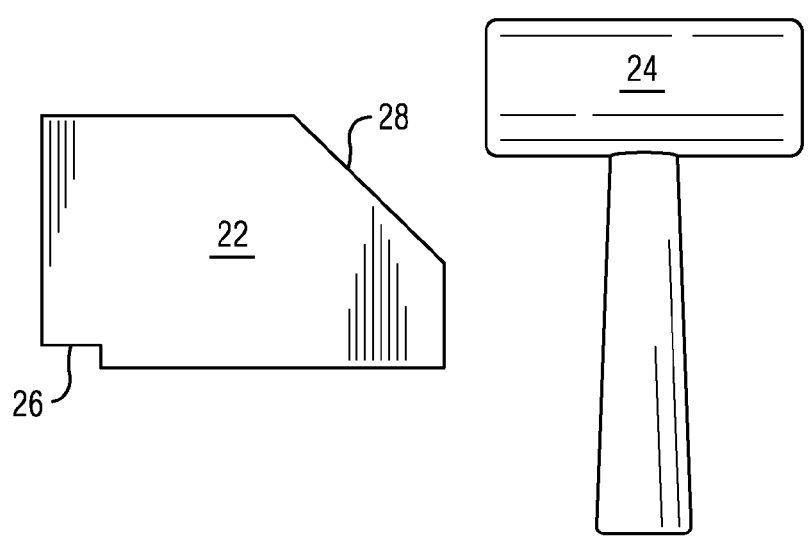
FIG. 2A is a plan view of a conventional block and mallet that are used to manually install the wedge in the slot of FIG. 1.
Figure 2B:
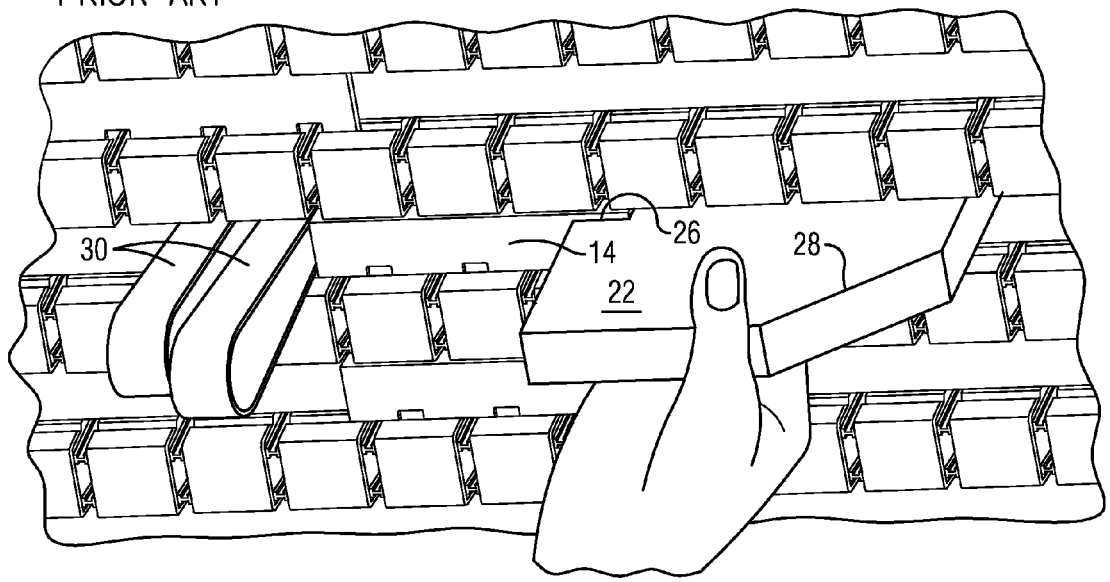
FIG. 2B is a plan view of the conventional block and mallet of FIG. 2A during the installation of the wedge in the slot of the stator core.

The inventors also recognized that the above-discussed conventional powered tool in Lape is limited to pulling filler layers under an installed wedge and cannot be used to drive wedges over filler layers in a stator core slot. The inventors further recognized that the tool of Lape could not be modified to drive wedges over filler layers, since even if the foot was shortened to pull wedges in the stator slot, there is no means within the tool housing, equivalent to the clip 30 of FIG. 2B, to apply necessary pressure on the filler layers, and prevent the filler layers from bowing up as the wedge is driven over the filler layers. Thus, the inventors recognized that it would be advantageous to develop a powered tool for driving wedges over filler layers, where the foot is positioned external to the housing, and thus a mechanism such as the clip 30 of FIG. 2B can be used to apply the necessary pressure on the filler layers as the wedge is driven over the filler layers.

Figure 3:
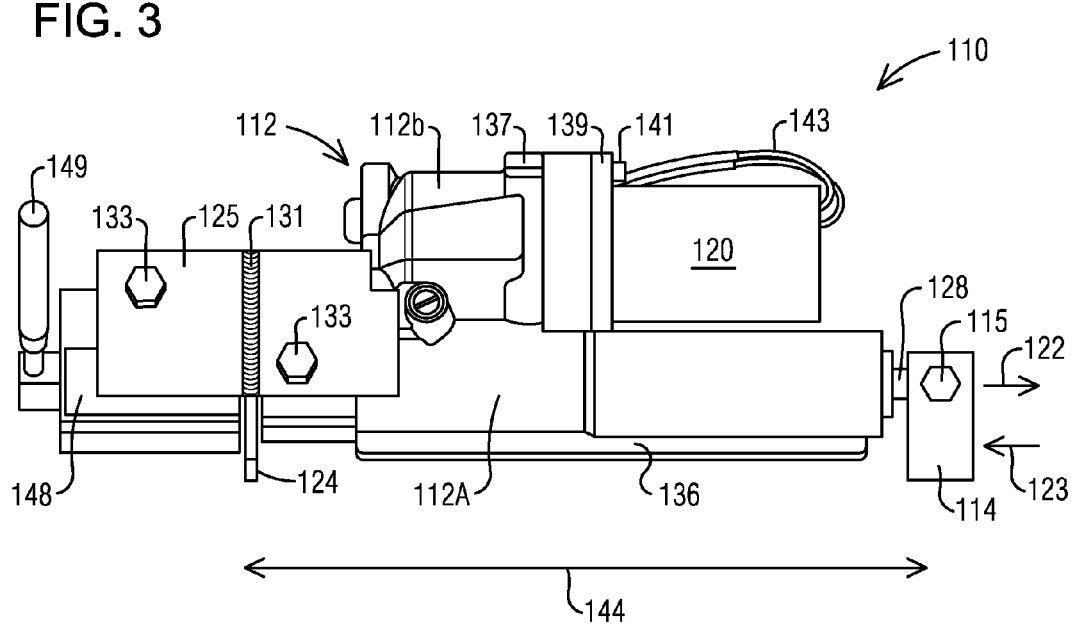
FIG. 3 is a side plan view of a tool for installing a wedge in a slot of a stator core.

FIG. 3 is a side plan view of a tool 110 for installing a wedge in a slot of a stator core. The tool 110 includes a lower housing 112a for a shaft 128 that extends axially from the lower housing 112a. A foot 114 positioned external to the lower housing 112a is attached to and extends radially from an end of the shaft 128. In an exemplary embodiment, the foot 114 is a rectangular cuboid that is secured to the end of the shaft 128 with a bolt 115. In the exemplary embodiment, the dimensions of the rectangular cuboid foot 114 are approximately 2.5 inches by 1.06 inches by 1.25 inches, for example. In the exemplary embodiment, the foot 114 is made from steel material, for example. Although FIG. 3 depicts that the foot 114 takes the form of a rectangular solid, the foot is not limited to this shape, and may take any form provided that the foot is capable of installing the wedges in the slots of the stator core.

As further illustrated in FIG. 3, the tool 110 includes an upper housing 112b integral with the lower housing 112a, to form an integrated housing 112. The tool 110 includes a pump 120 that is operatively coupled to the shaft 128 to actuate the shaft 128 and the foot 114 in a first axial direction 122 or a second axial direction 123 opposite to the first axial direction 122. The pump 120 is secured to the upper housing 112b with a flange 139 that is bolted to an opposing flange 137 of the upper housing 112b with a plurality of fasteners 141. The pump 120 receives an electrical input from an external power supply (not shown) through a cable 143, such as a 12 volt DC input, for example. In an exemplary embodiment, the pump 120 is an Electro-Hydraulic Actuator (EHA), which includes an internal reservoir (not shown) for pressurized fluid and an internal cylinder that moves in response to the electrical input and causes the shaft 128 to move in the first axial direction 122 or the second axial direction 123, as appreciated by one skilled in the art. In an exemplary embodiment, the pump 120 is a Parker® EHA Model No. 648756, for example. Although the above embodiment discusses the use of an EHA for the pump 120, the present invention is not limited to this embodiment and the pump may be any means that can be used to actuate the shaft 128 and foot 114 in the axial direction 122.

Figure 4A:
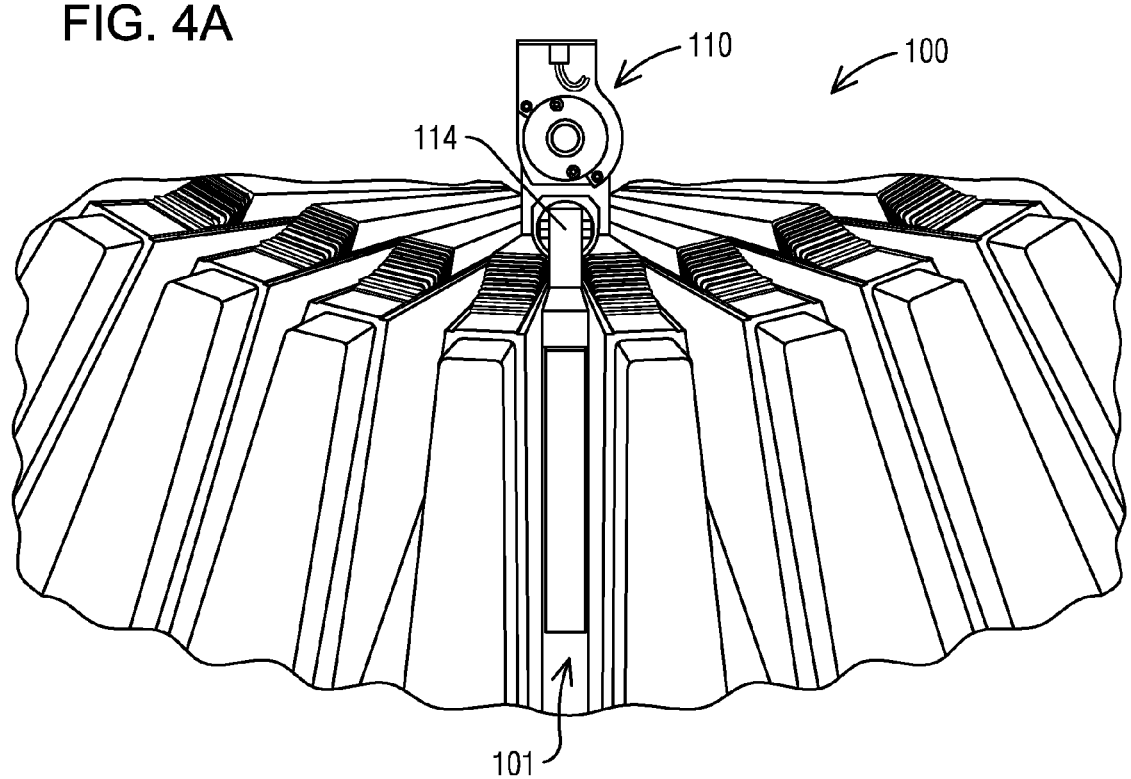
FIGS. 4A-4C are axial end views of the tool of FIG. 3 positioned in a slot of a stator core.
Figure 4B:
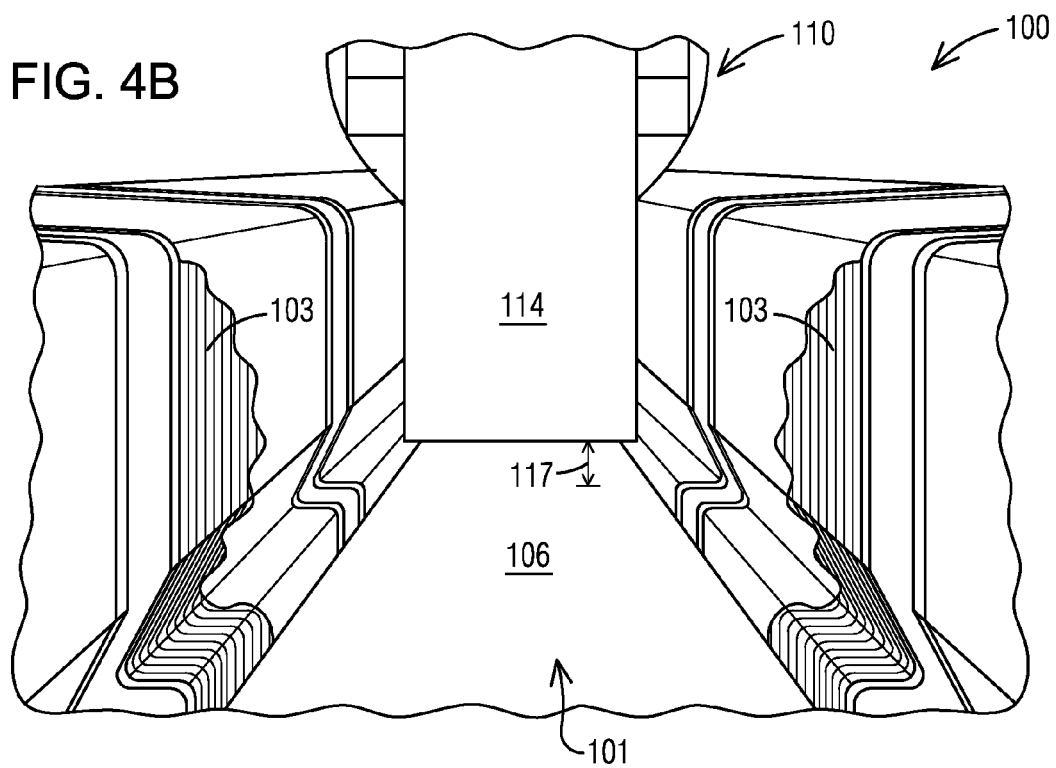
Figure 4C:
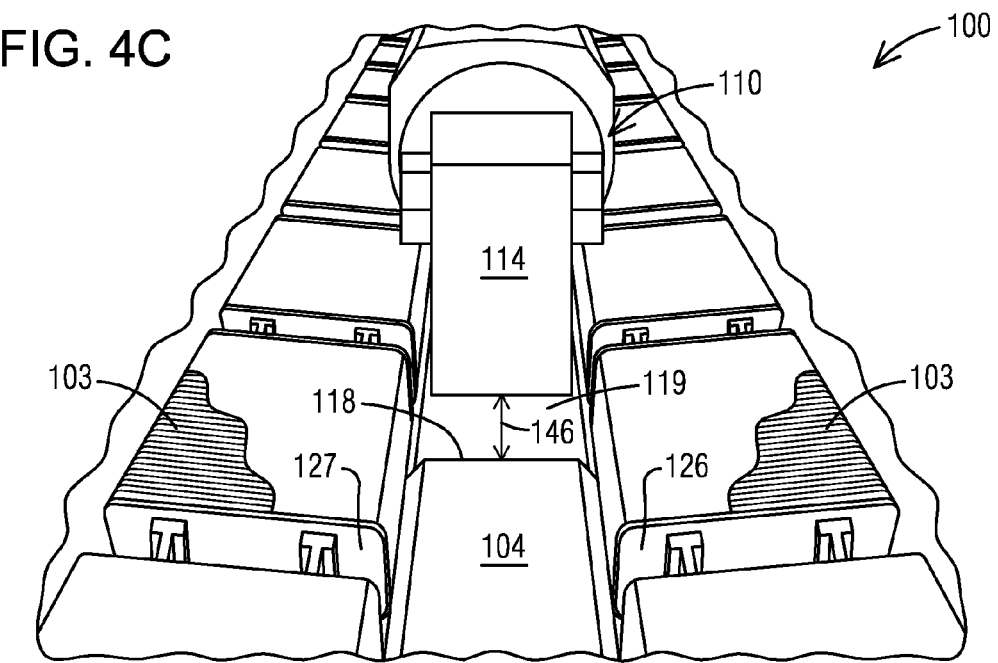

FIGS. 4A-4C are axial end views of the tool 110 of FIG. 3 positioned in a slot 101 of a stator core 100. As illustrated in FIG. 4A, the slot 101 is in a lower portion of the stator core 100, so that a worker need not provide vertical support to the tool 110 during the installation process. As illustrated in FIG. 4B, the tool 110 is positioned in the slot 101, such that a base of the foot 114 is positioned at a threshold distance 117 above the PSDS 106 in the slot 101. In an exemplary embodiment, the threshold distance 117 may be within a range of 0.100-0.250 inches, for example. As illustrated in FIG. 4C, to install a wedge 104 in the slot 101 of the stator core 100, the tool 110 is initially positioned such that the foot 114 is positioned within a threshold distance 146 of a surface 118 of the wedge 104 on a first side 119 of the wedge 104, as discussed in further detail below. In an exemplary embodiment, the threshold distance 146 is less than a difference between a length of the shaft 128 and a length of the wedge 104, to ensure that the shaft 128 can actuate the foot 114 from the position of FIG. 4C to over the length of the wedge 104, during the installation of the wedge 104. In an exemplary embodiment, the length of the shaft 128 is in a range of 7-9 inches, the length of the wedge 104 is in a range of 5-7 inches, and the threshold distance 146 is less than 1 inch, for example. However, these numerical dimension ranges are merely exemplary and the embodiments of the invention are not limited to these numerical ranges. Although the embodiment of FIG. 3 depicts that the foot 114 extends radially from an end of the shaft 128, in an exemplary embodiment, the end of the shaft 128 may be used as the foot to install the wedges 104 in the slot 101, provided that the shaft is radially positioned at the threshold distance 117 above the PSDS 106 in the slot 101 when the tool 110 is positioned in the slot 101. In an exemplary embodiment, the shaft 128 is in compression during operation to provide an urging force to install the wedge 104 over the filler layers and PSDS 106.

FIGS. 5A-5D illustrate a plurality of stages of installation of the wedge 104 at an installation location 107 in the slot 101 of the stator core 100 using the tool 110 of FIG. 3. As with the conventional method previously discussed, prior to installing the wedge 104 in the slot 101, filler layers and PSDS 106 are initially positioned at the installation location 107 and the wedge 104 tightness is checked. If one or more of the filler layers or PSDS 106 needs to be removed or added, this step is performed prior to the installation of the wedge 104 with the tool 110, to ensure that the wedge 104 is installed with a desired level of tightness over the filler layers and PSDS 106.

Figure 5A:
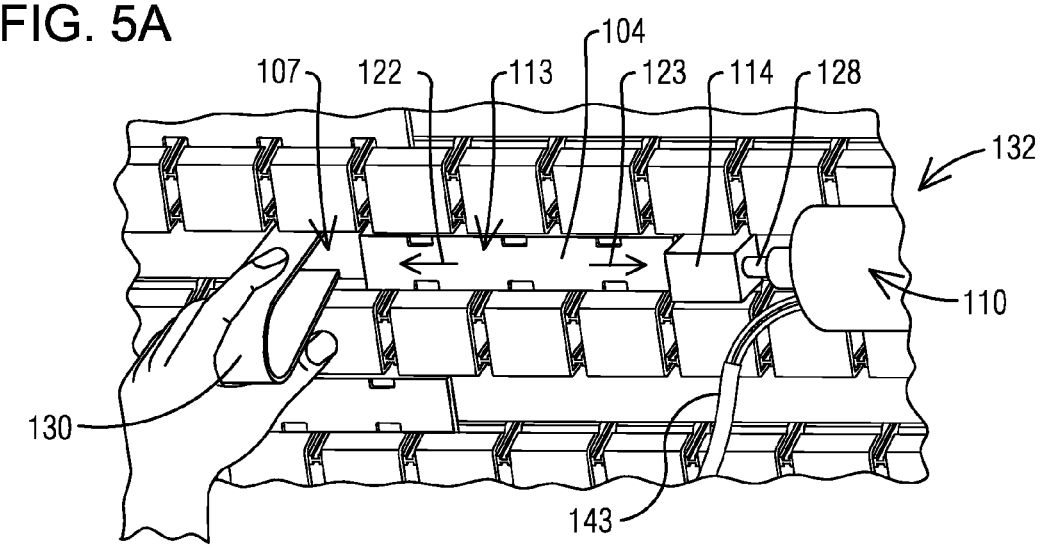
FIGS. 5A-5D are a plurality of stages of installation of a wedge in a slot of a stator core using the tool of FIG. 3.
Figure 5B:
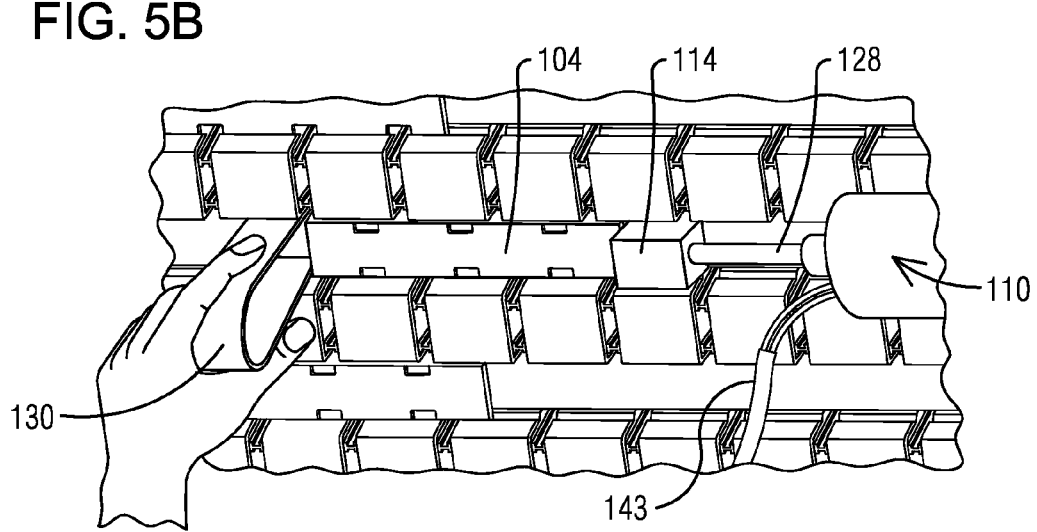
Figure 5C:
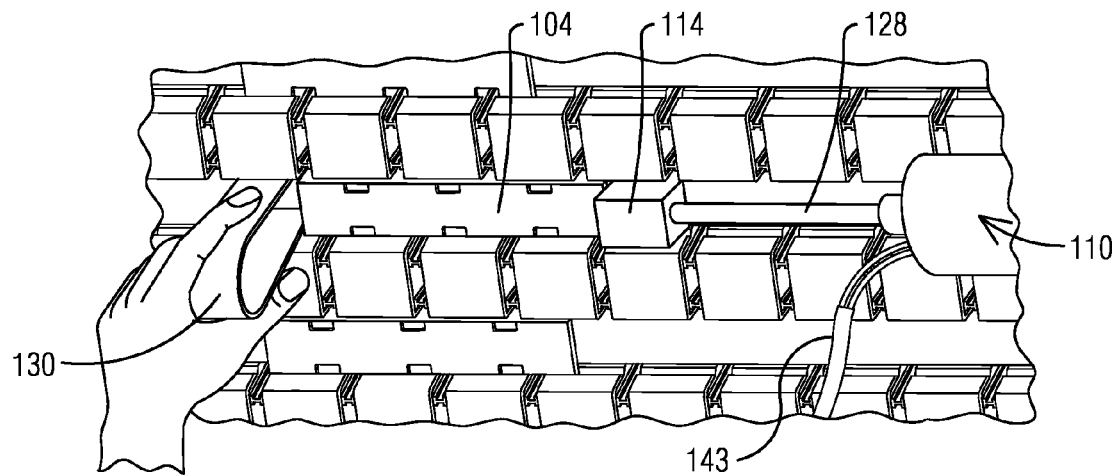
Figure 5D:
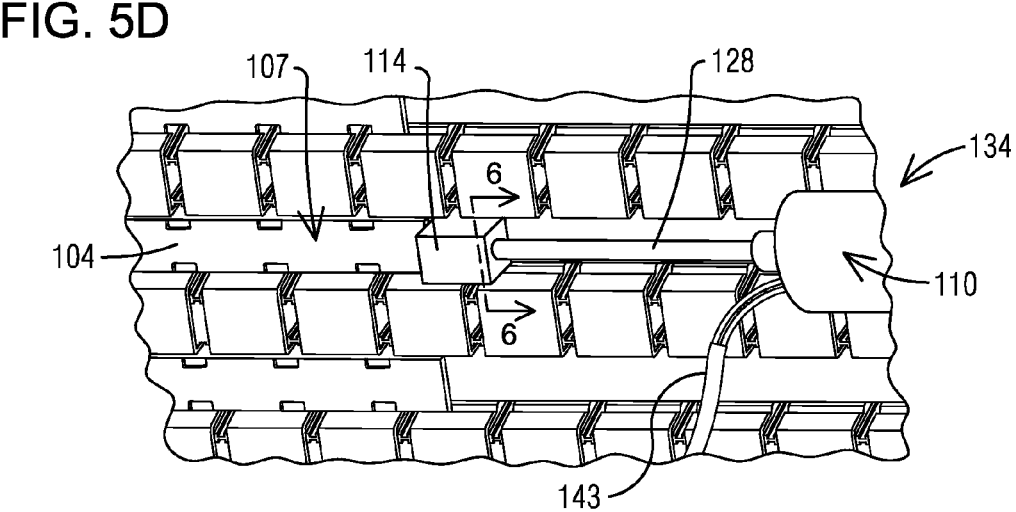

Once the wedge 104 is ready to be installed over the filler layers and PSDS 106 at the installation location 107, the wedge 104 is initially positioned at a pre-installation location 113 adjacent to the installation location 107, as shown in FIG. 5A. The tool 110 is then positioned in the slot 101 such that the foot 114 is located within the threshold distance 146 of the surface 118 of the wedge 104 on the first side 119 of the wedge 104, as previously illustrated in FIG. 4C. The worker then uses a remote control (not shown) to deliver an electrical input from the power supply to the pump 120 through the cable 143 such that the pump 120 actuates the shaft 128 and the foot 114 in the first axial direction 122. A worker applies downward pressure on the filler layers and PSDS 106 with a clip 130 at the installation location 107, as the wedge 104 is driven over the filler layers and the PSDS 106 in the axial direction 122 by the foot 114. FIGS. 5B-5D illustrate the subsequent stages of the installation of the wedge 104 over the filler layers and PSDS 106, as the shaft 128 and the foot 114 move in the axial direction 122 from a retracted position 132 (FIG. 5A) to an extended position 134 (FIG. 5D), where both of the retracted and extended positions 132, 134 are external to the housing 112a, 112b. When the worker visually sees that the foot 114 has reached the extended position 134 and installed the wedge 104 over the filler layers and PSDS 106, the worker uses the remote control to stop the electrical input to the pump 120, so that the foot 114 ceases movement in the first axial direction 122. The worker then subsequently uses the remote control to deliver an electrical input to the pump 120 such that the pump 120 actuates the shaft 128 and the foot 114 in the second axial direction 123 opposite to the first axial direction 122, so the foot 114 moves from the extended position 134 (FIG. 5D) back to the retracted position 132 (FIG. 5A). When the worker visually sees that the foot 114 has reached the retracted position 132, the worker uses the remote control to stop the electrical input to the pump 120, so that the foot 114 stops at the retracted position 132. The worker then moves the tool 110 to another installation location and installs another wedge using the same stages of installation discussed above. In an exemplary embodiment, the worker starts at a central axial location along the stator core 100 and moves axially outward toward opposing axial ends of the stator core 100, as the tool 110 installs the wedges in the slots. In another exemplary embodiment, the worker may use the tool 110 to install a plurality of wedges in a plurality of slots at a fixed axial location of the stator core 100, before the worker moves (outward) to a subsequent axial location of the stator core 100. For example, the worker may use the tool 110 to install wedges in 4-5 slots at a fixed axial location of the stator core 100.

Figure 1:
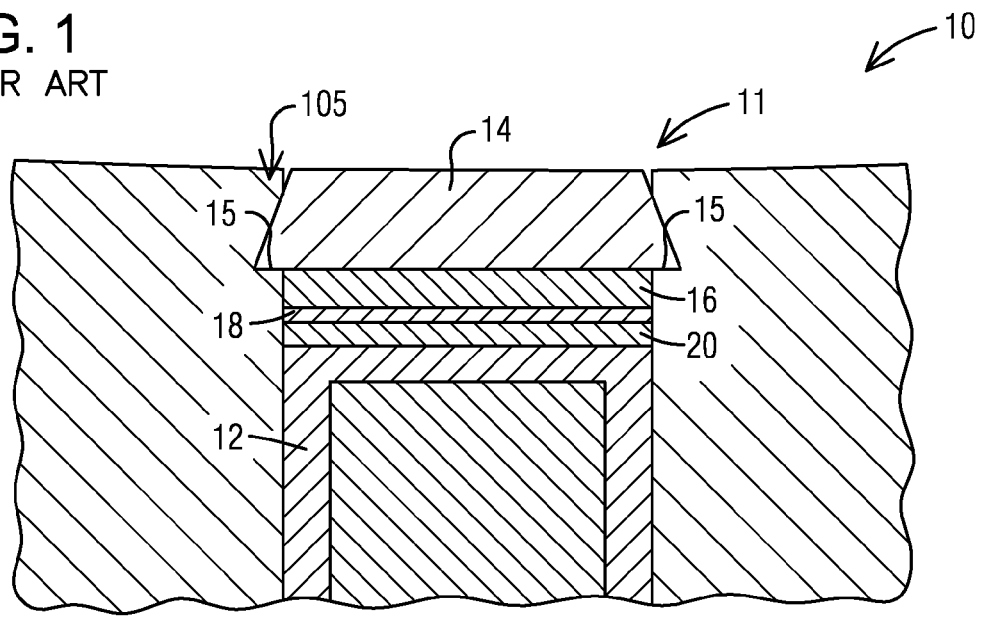
FIG. 1 is a cross-sectional axial view of a stator wedge, PSDS and filler layers known to be used to maintain coils in a slot of a stator core.
Figure 6:
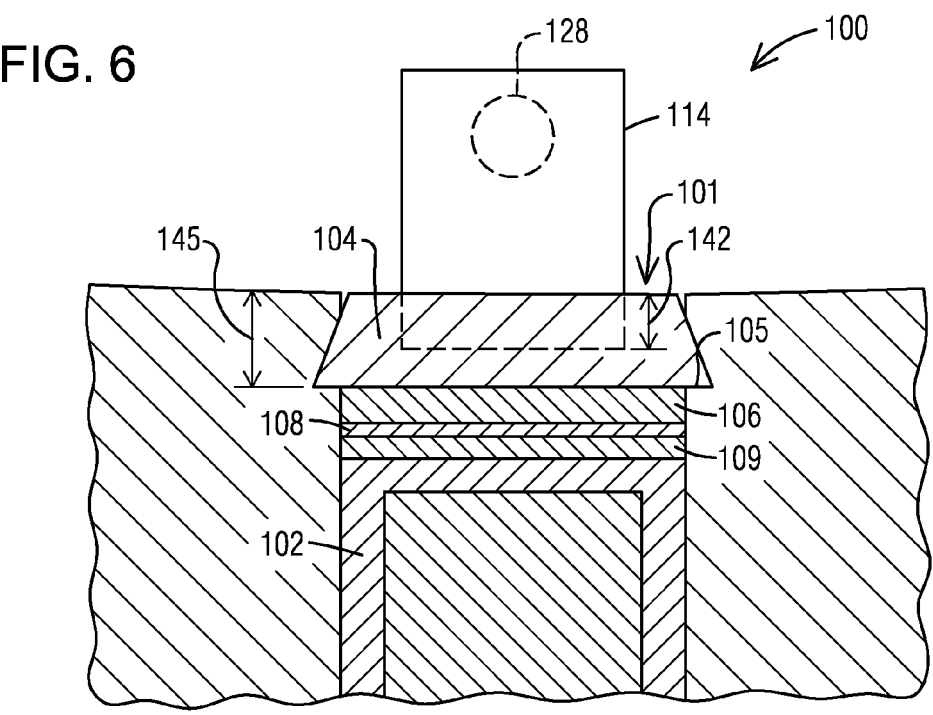
FIG. 6 is a cross-sectional axial view of FIG. 5D taken along the line 6-6.

FIG. 6 is a cross-sectional axial view of FIG. 5D taken along the line 6-6. As with the slot 11 in the stator core 10 of FIG. 1, the slot 101 of the stator core 100 includes coils 102 seated within the slot 101 and held in place by the wedge 104 that is received within an axial groove 105, a PSDS 106, and one or more filler layers 108, 109. During the installation stages of FIGS. 5A-5D, the wedge 104 is axially driven along the axial groove 105 and over the PSDS 106 and filler layers 108, 109. These support components are employed in order to maintain the coils 102 in a radially tight condition within the slot 101. As illustrated in FIG. 6, during installation, the foot 114 extends by a radial depth 142 into the slot 101. In an exemplary embodiment, the radial depth 142 is in a range of 0.150-0.200 inches, for example. More specifically, the foot 114 overlaps with a portion of a radial depth 145 of the wedge 104 in the slot 101. In an exemplary embodiment, the radial depth 145 of the wedge 104 is approximately 0.375 inches, for example, and the overlap portion is approximately 0.200 inches, for example. In an exemplary embodiment, the foot 114 radially extends to cover an upper half of the radial depth 145 of the wedge 104 in the slot 101. Since the wedge 104 is received within the axial groove 105 of the slot 101, the radial depth 145 of the wedge 104 within the slot 101 remains fixed. During the axial movement of the foot 114 in the slot 101, the foot 114 remains aligned with the surface 118 of the wedge 104 and aligned above the PSDS 106 and filler layers 108, 109 within the slot 101, as previously depicted in FIGS. 4B-4C. Thus, during the installation stages of FIGS. 5A-5D, the foot 114 moves in the axial direction 122 along the slot 101 and engages the wedge 104 without engaging the PSDS 106 and filler layers 108, 109. Additionally, during the installation stages, a base 136 of the housing 112a of the tool 110 (FIG. 3) is shaped to be received within the axial groove 105 in the slot 101 on the first side of the wedge 104.

Figure 7:
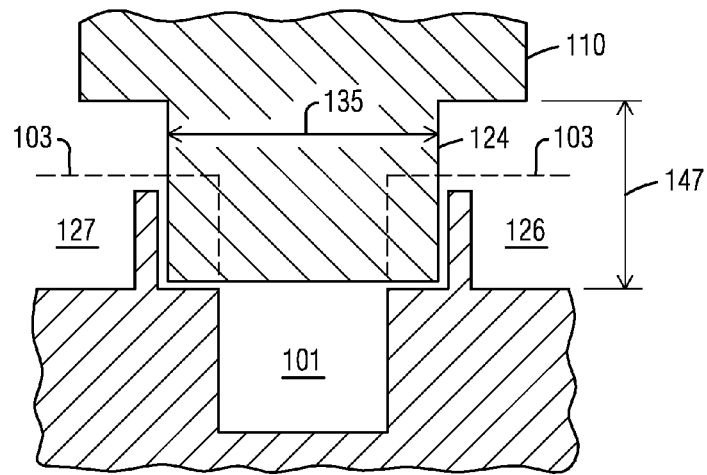
FIG. 7 is a cross-sectional axial view of FIG. 5D taken along the tongue of the tool.

As further illustrated in FIG. 3, the tool 110 includes a planar tongue 124 that extends from a base of the tool 110, and a pair of vertical plates 125 spaced apart and secured together with a pair of bolts 133. The tongue 124 extends from the base of the tool 110 at an axial location that corresponds to a vertical groove 131 in the vertical plates 125. As illustrated in FIG. 4C, the stator slot 101 is formed between circumferentially-spaced stator teeth 103 that include regular spaced vent gaps 126, 127 on opposite sides of the slot 101. FIG. 7 is a cross-sectional axial view of FIG. 5D taken along the tongue 124 of the tool 110. As illustrated in FIG. 7, the vent gaps 126, 127 are orthogonal to the slot 101 and allow for ventilation and cooling of the stator core 100, as appreciated by one skilled in the art. As illustrated in FIG. 7, the tongue 124 is inserted into the vent gaps 126, 127 on opposite sides of the slot 101 on the first side 119 of the wedge 104. The tongue 124 and the foot 114 are separated by an axial distance 144 selected such that upon inserting the tongue 124 into the vent gaps 126,127, the foot 114 is positioned within the threshold distance 146 (FIG. 4C) of the surface 118 of the wedge 104. In an exemplary embodiment, the axial distance 144 is within a range of 13-15 inches, for example. The tongue 124 has a length 135 and a depth 147 that is sized to extend across the slot 101 and into the vent gaps 126, 127. In an exemplary embodiment, the length 135 of the tongue 124 is in a range of 1.04-1.06 inches and the depth 147 of the tongue 124 is in a range of 0.5-1 inch, such as 0.75 inches, for example. As further illustrated in FIG. 7, edges of the stator teeth 103 are positioned on either axial side of the tongue 124 within the vent gaps 126, 127. During the installation stages of the wedge 104 in FIGS. 5A-5D, as the foot 114 actuates a force in the axial direction 122 on the wedge 104, the stator teeth 103 on either side of the tongue 124 brace the tool 110 against the slot 101, for enhanced stability during installation.

Figure 8:
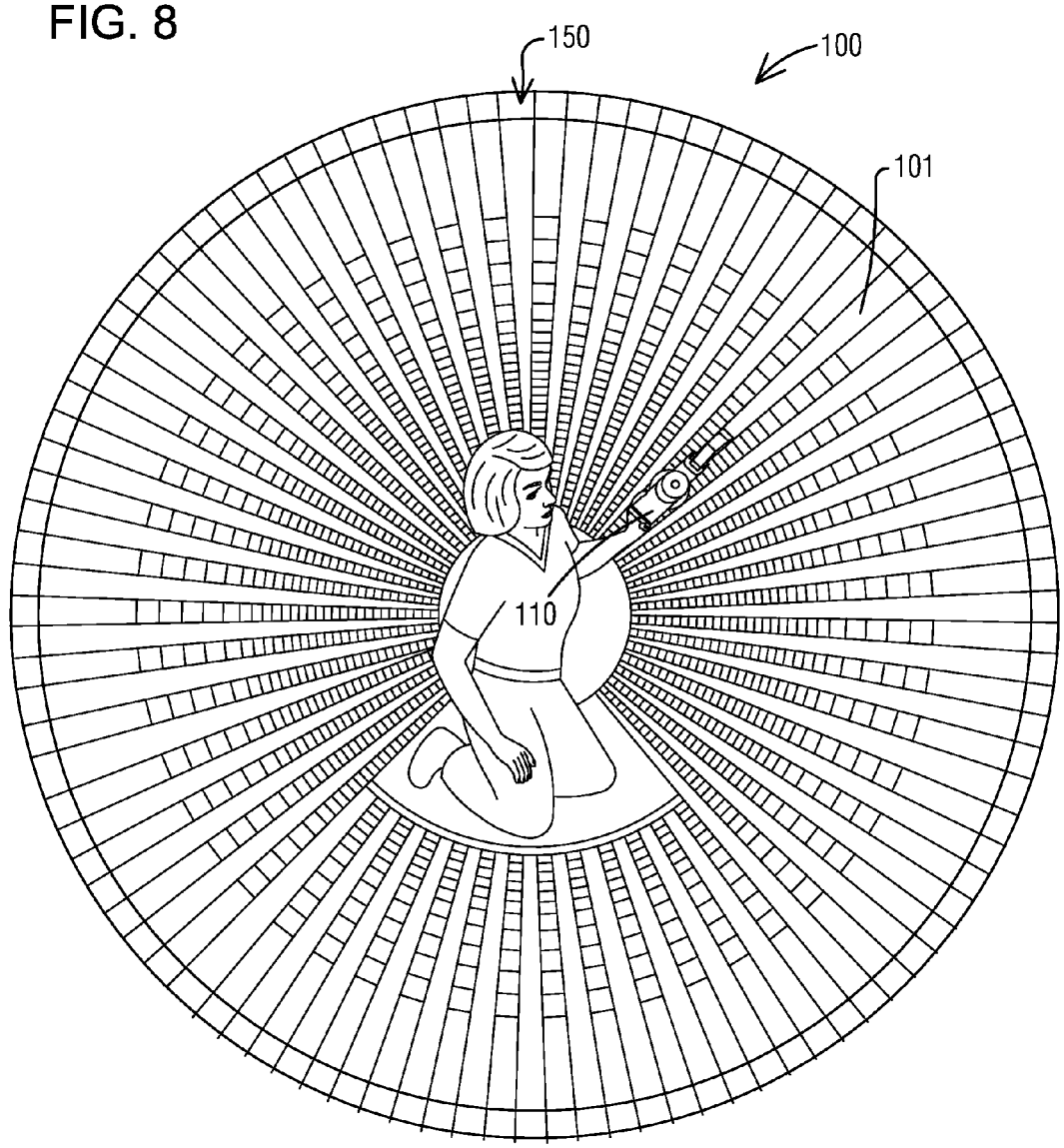
FIG. 8 is an axial end view of a worker holding the tool of FIG. 3 within a slot of an upper portion of the stator core.

As further illustrated in FIG. 3, the tool 110 includes a magnet 148 secured between the vertical plates 125, such as with the bolts 133. In an exemplary embodiment, the magnet 148 is optional and is used when the tool 110 installs wedges 104 in slots 101 of an upper portion of the stator core 100, such as slots 101 in an upper half of the stator core 100, for example. When the tool 110 is positioned in the stator slot 101, the magnet 148 interacts with iron in the stator teeth 103, to impart an outward radial force on the tool 110 within the slot 101. In an exemplary embodiment, since the magnet 148 is positioned near the tongue 124 of the tool 110, the outward radial force maintains the tongue 124 within the vent gaps 126, 127 of the slot 101 during the installation of the wedge 104 in the slot 101. FIG. 8 is an axial end view of a worker holding the tool 110 of FIG. 3 within the slot 101 of an upper portion 150 of the stator core 100. In an exemplary embodiment, during the phases (FIG. 5A-5D) of the installation of the wedge 104 in the slot 101, the worker places a hand on the tool 110, to guide the tool 110 during the installation process. When the magnet 148 is activated by a switch 149 on the tool 110, the outward radial force is generated to maintain the tongue 124 in the vent gaps 126, 127. During the initial phase (FIG. 5A) of the installation of the wedge 104 in the slot 101 of the upper portion 150 of the stator core 100, the worker imparts an outward radial force on the tool 110. After the foot 114 engages the wedge 104 in the subsequent installation phases (FIGS. 5B-5D), the worker need only guide the tool 110 by maintaining their hand on the tool 110, for safety purposes to ensure that the tool 110 does not fall. Although the tool 110 depicted in FIG. 3 includes the magnet 148 between the vertical plates 125 near the tongue 124, the magnet 148 need not be positioned at this location along the tool 110, and may be positioned at any location along the tool 110. Additionally, more than one magnet may be positioned along the tool 110, to provide further lift assistance during the installation process.

Figure 9:
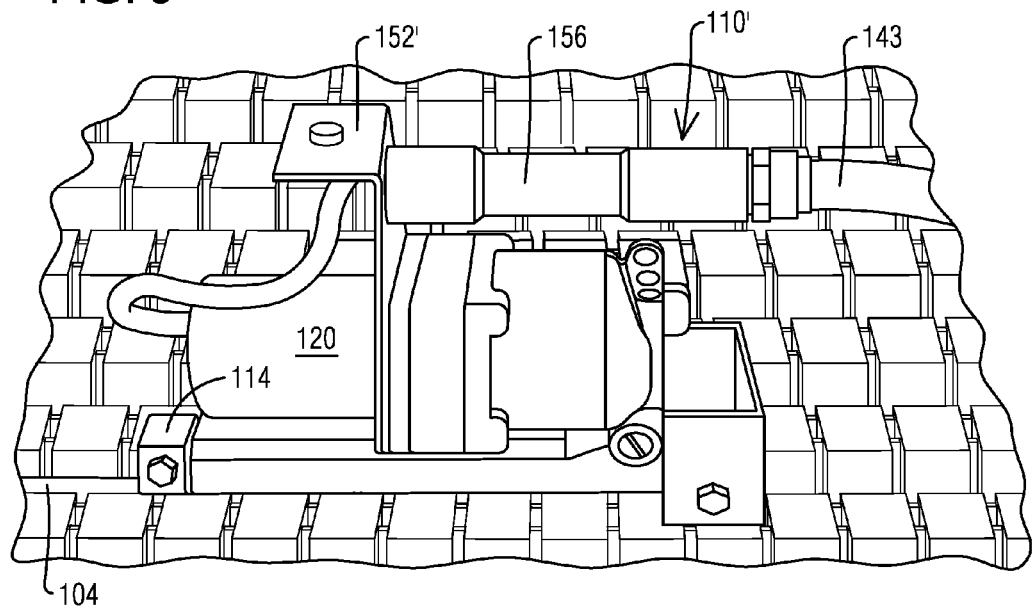
FIG. 9 is a perspective view of another embodiment of a tool for installing a wedge in a slot of a stator core.

FIG. 9 is a perspective view of another embodiment of a tool 110' for installing the wedge 104 in the slot 101 of the stator core 100. The tool 110' depicted in FIG. 9 is similar to the tool 110 of FIG. 3, with the exception that the tool 110' does not include the magnet 148 and further includes a handle 156 with a control device 152' integrated into the handle 156. In an exemplary embodiment, the handle 156 is used by the worker to guide the tool 110' during the installation stages of the wedge 104 in the slot 101 in the upper portion 150 of the stator core 100, as previously depicted in FIG. 8. In an exemplary embodiment, the tool 110 may include the handle 156 of FIG. 9, to provide a means for the worker to grasp the tool 110 during the installation process. As illustrated in FIG. 9, the power cable 143 from the power supply (not shown) is connected to one end of the handle 156. The control device 152' is used in a similar manner as the remote control in the above embodiment. Specifically, the control device 152' includes a user input, such as a button that can be pressed by the worker, to deliver power from a power supply through the power cable 143 and to the pump 120 of the tool 110', to actuate the foot 114 in the first axial direction 122. After the worker visually confirms that the foot 114 has installed the wedge 104 over the PSDS 106 (FIG. 5D), the worker presses the button a second time, which ceases the delivery of power through the power cable 143 to the pump 120, thereby ceasing movement of the foot 114. The worker then presses the button a third time, to deliver power from the power supply through the cable 143 and to the pump 120, to actuate the foot 114 in the second axial direction 123. After the worker visually confirms that the foot 114 has moved back to the retracted position 132 (FIG. 5A), the worker presses the button a fourth time, which ceases the delivery of power through the power cable 143 to the pump 120, thereby ceasing movement of the foot 114. The worker can then move the tool 110' using the handle 156 to a subsequent location to install another wedge in the stator core, in the manner discussed in the previous embodiment. Although the above discussed embodiment involves a user input which is actuated four times based on the installation stages of FIGS. 5A-5D, this is merely one exemplary configuration of the control device 152'. In an exemplary embodiment, the control device 152' may be automatic and configured to move and stop the foot 114 at the retracted and extended positions 132, 134, in response to one or more sensors that are positioned to detect when the foot 114 has reached the retracted and extended position 132, 134, for example.

Figure 11:
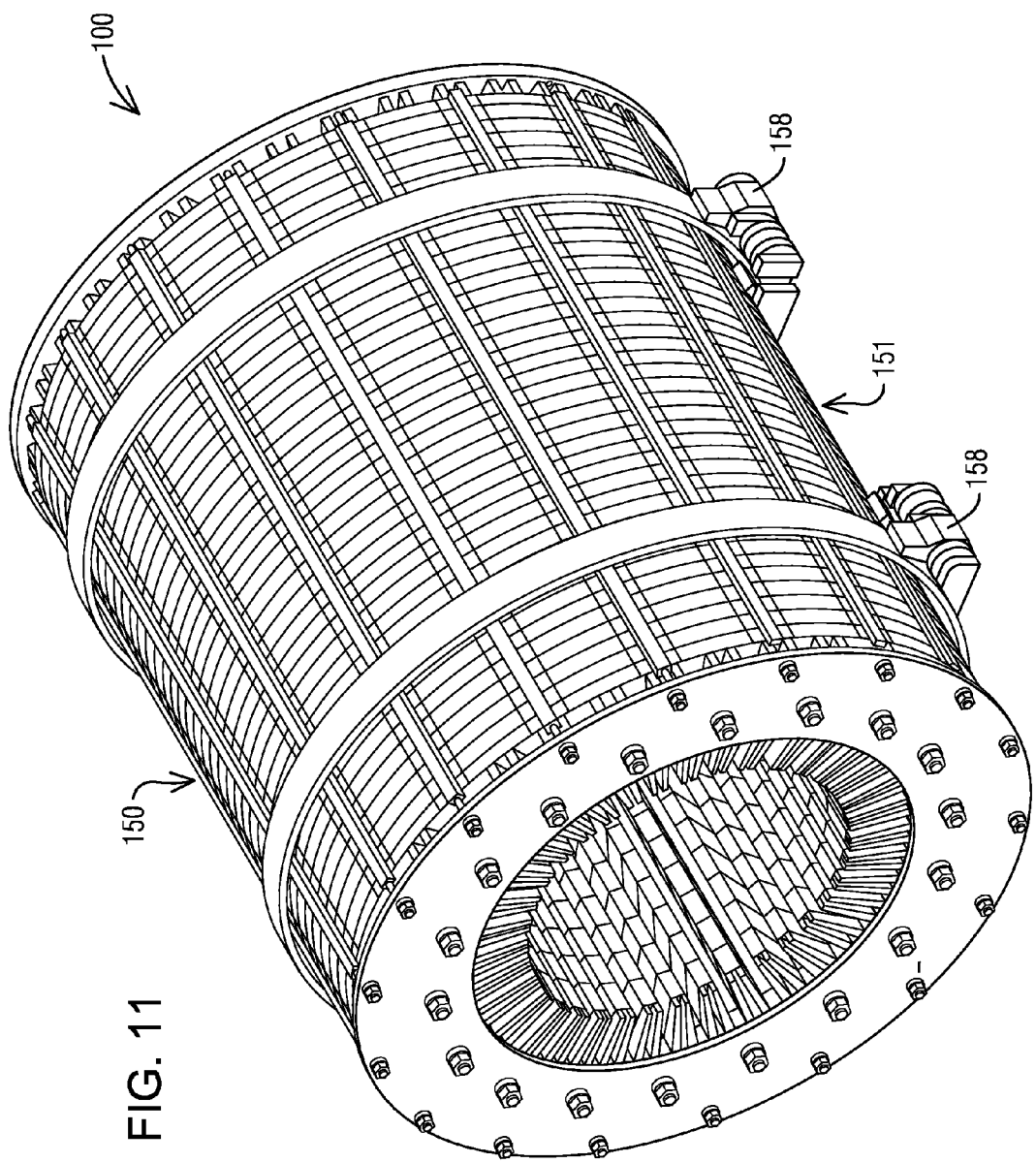
FIG. 11 is a perspective view of a stator core with a roller device.

FIG. 10 is an axial end view of the tool 110' of FIG. 9 within the slot 101 of a lower portion 151 of the stator core 100. In an exemplary embodiment, the lower portion 151 of the stator core 100 is the lower half of the stator core 100, for example. In an exemplary embodiment, the tool 110' is used to install the wedges 104 in the slots 101 of the lower portion 151 of the stator core 100, since the magnet 148 is not required to install wedges in the slots 101 of the lower portion 151 of the stator core 100. In a first phase of installation, the tool 110' is used to install the wedges 104 in the slots 101 of the lower portion 151 of the stator core 100, using the steps previously discussed. FIG. 11 is a perspective view of the stator core 100 with a roller device 158. During a second phase of installation, the roller device 158 is used to rotate the stator core 100 such that the slots in an upper portion 150 of the stator core 100 (without installed wedges) are rotated to a lower portion 151 of the stator core 100. During a third phase of installation, the tool 100' can then be used to install the wedges 104 in the slots 101 of the (new) lower portion 151, after the rotation of the stator core 100 with the roller device 158. Although FIGS. 10-11 depict that the tool 110' is used for the installation of the wedges 104, the tool 110 may similarly be used for the installation of the wedges 104. In an exemplary embodiment, the embodiment of FIGS. 10-11 may be employed in a manufacturing location of the stator core 100, for example, which includes the roller device 158.

Figure 12A:
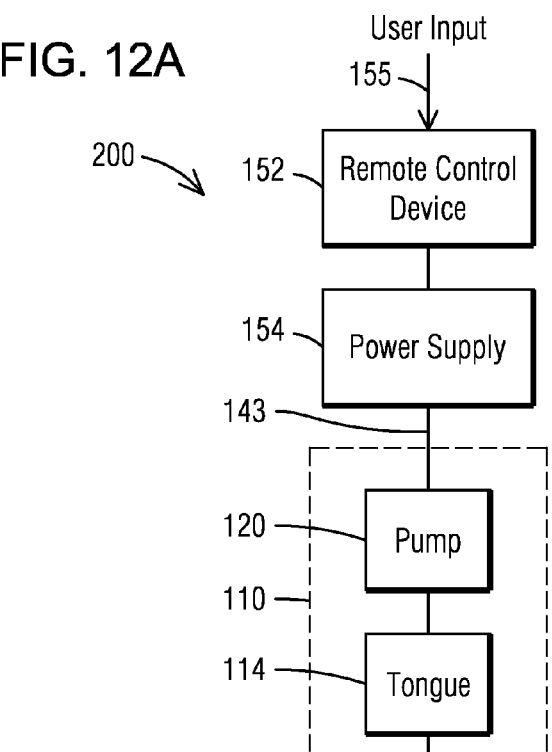
FIGS. 12A and 12B are schematic diagrams of systems for installing a plurality of wedges in the slots of a stator core.

FIG. 12A is a schematic diagrams of a system 200 for installing a plurality of wedges 104 in the slots 101 of the stator core 100, using the tool 110 of FIG. 3. The system 200 includes a remote control device 152 that receives user input 155. In order to install the wedge 104 in the slot 101, the worker provides a first input 155 to the remote control device 152, which transmits a signal to the power supply 154, to deliver an electrical input to the pump 120 through cable 143. In response to the electrical input, the pump 120 actuates the foot 114 in the first axial direction 122. When the worker visually sees that the foot 114 has reached the extended position 134 and installed the wedge 104 over the filler layers and PSDS 106, the worker provides a second input 155 to the remote control device 152, which stops the electrical input from the power supply 154 to the pump 120, so that the tongue 124 ceases movement in the first axial direction 122. The worker then provides a third input 155 to the remote control device 152 to deliver an electrical input from the power supply 154 to the pump 120 such that the pump 120 actuates the foot 114 in the second axial direction 123, so the foot 114 moves from the extended position 134 (FIG. 5D) back to the retracted position 132 (FIG. 5A). When the worker visually sees that the foot 114 has reached the retracted position 132, the worker provides a fourth input 155 to the remote control device 152, which stops the electrical input from the power supply 154 to the pump 120, so that the foot 114 ceases movement in the second axial direction 123. The worker then moves the tool 110 to another installation location and installs another wedge in the stator core 100 until all wedges are installed in the stator core 100.

Figure 12B:
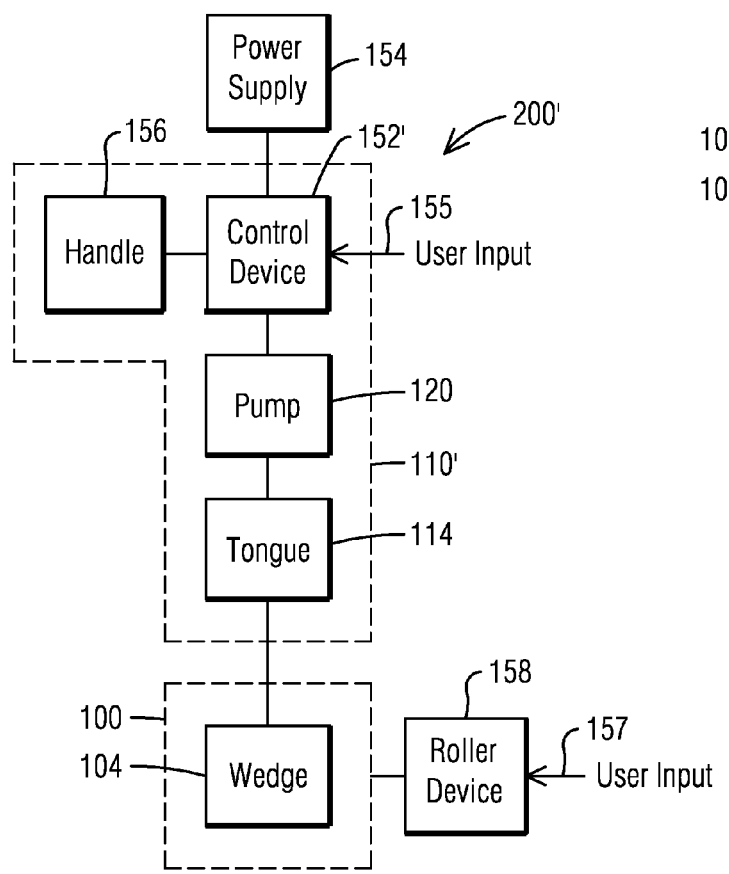

FIG. 12B is a schematic diagrams of a system 200' for installing a plurality of wedges 104 in the slots 101 of the stator core 100, using the tool 110' of FIG. 9. The system 200' includes the control device 152' that is integrated into the handle 156 of the tool 110'. In order to install the wedge 104 in the slot 101, the worker provides inputs 155 to the control device 152' in a similar manner as the inputs 155 were provided to the remote control device 152 of the system 200. Once the worker has used the tool 110' to install the wedges 104 in the slots 101 of the lower portion 151 of the stator core 100, a second user input 157 may be provided to the roller device 158, to rotate the slots 101 in the upper portion 150 of the stator core 100 to the lower portion 151 of the stator core 100. The worker then uses the tool 110' to install the wedges 104 in the slots 101 of the (new) lower portion 151 of the stator core 100. To install the wedges 104 in the slots 101 of the stator core 100, the worker begins at a central axial location along the stator core 100 and installs wedges as the worker moves outward toward opposing axial ends of the stator core 100. In an exemplary embodiment, a last wedge at an axial end of each slot in the stator core may be installed using the conventional methods discussed in FIGS. 2A-2B.

FIG. 13 is a flowchart depicting a method 300 for installing a plurality of wedges 104 over one or more filler layers 108, 109 in the slot 101 of the stator core 100. The method 300 begins by inserting 302 the tongue 124 in the vent gap 126, 127 of the slot 101 on a first side 119 of the wedge 104. The method 300 further includes extending 304 the foot 114 into the slot 101 on the first side 119 of the wedge 104. The method 300 further includes actuating 306 the foot 114 in the axial direction 122 away from the tongue 124 with the pump 120 operatively coupled to the foot 114. The method 300 further includes imparting pressure 308 with the clip 130 to the one or more filler layers 108, 109 as the foot 114 actuates the wedge 104 in the axial direction 122 over the one or more filler layers 108, 109. Although the flowchart depicts that the method 300 includes the specific steps listed above, the method 300 may include less or more steps, including the other steps discussed above which are performed during the installation of one or more wedges in the stator core.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A tool for installing a wedge in a slot of a stator core, comprising:
    a housing;
    a shaft extending axially from the housing, wherein an end of the shaft is positionable in the slot on a first side of the wedge to engage a surface of the wedge;
    a pump operatively coupled to the shaft to actuate the shaft in an axial direction external to the housing to install the wedge in the slot; and
    a tongue configured to be inserted in a vent gap of the slot on the first side of the wedge to brace the tool against the slot during installation of the wedge.

2. The tool of claim 1, further comprising a foot extending radially from the end of the shaft and positionable into the slot on the first side of the wedge to engage the surface of the wedge and wherein the pump is configured to actuate the foot in the axial direction.

3. The tool of claim 2, wherein the foot is configured to extend radially from the end of the shaft by a depth such that the foot is radially aligned with the surface of the wedge and radially above a filler layer in the slot.

4. The tool of claim 2, wherein the tongue and the foot are separated by an axial distance selected such that upon inserting the tongue into the vent gap, the foot is positioned within a threshold distance of the surface of the wedge.

5. The tool of claim 4, wherein the threshold distance is less than a difference between a length of the shaft and a length of the wedge.

6. The tool of claim 5, wherein the length of the shaft is in a range of 7-9 inches, the length of the wedge is in a range of 5-7 inches, and the threshold distance is less than 1 inch.

7. The tool of claim 1, wherein the pump is configured to actuate the shaft from a retracted position within the housing to an extended position external to the housing to install the wedge in the slot.

8. The tool of claim 1, wherein the wedge is installed in an axial groove of the slot, and wherein a base of the housing is shaped to be received within the axial groove in the slot on the first side of the wedge.

9. The tool of claim 1, wherein a length of the shaft is greater than a length of the wedge.

10. The tool of claim 1, wherein the tongue is planar and is configured to be inserted in a pair of vent gaps on opposite sides of the slot.

11. The tool of claim 1, further comprising a magnet configured to impart a force to maintain the tongue within the vent gap of the slot in an upper portion of the stator core.

12. The tool of claim 1, wherein a remote control is communicatively coupled to the pump to manually activate the pump to actuate the shaft in a first axial direction from a retracted position external to the housing to an extended position external to the housing to install the wedge in the slot, said remote control further configured to manually activate the pump to actuate the shaft in a second axial direction opposite to the first axial direction from the extended position to the retracted position.

13. A system for installing a plurality of wedges over at least one filler layer in
    a slot of a stator core, comprising:
    a tool comprising;
    a housing;
    a shaft extending axially from the housing;
    a foot extending radially from the shaft and positionable into the slot to engage a surface of the wedge,
    a pump operatively coupled to the foot to actuate the foot in an axial direction external to the housing to install the wedge over the at least one filler layer in the slot, and
    a tongue configured to be inserted in a vent gap of the slot to brace the tool against the slot during installation of the wedge; and
    a control device communicatively coupled to the pump to manually activate the pump to actuate the foot in the axial direction to install the wedge over the at least one filler layer.

14. The system of claim 13, wherein the foot is configured to extend into the slot on a first side of the wedge, and wherein the tongue is configured to be inserted into the vent gap on the first side of the wedge.

15. The system of claim 13, wherein the shaft is positioned in the housing with the foot extending from an end of the shaft; wherein the pump is configured to actuate the shaft in the axial direction from a retracted position within the housing to an extended position external to the housing to install the wedge in an axial groove of the slot, and wherein a base of the housing is shaped to be received within the axial groove in the slot.

16. The system of claim 13, wherein the tool further comprises a handle with the control device integrated into the handle.

17. The system of claim 13, further comprising a roller device to rotate the stator core such that the slot is in a lower portion of the stator core.

18. The system of claim 13, wherein the tool further comprises a magnet configured to impart a force to maintain the tongue within the vent gap of the slot in an upper portion of the stator core.

* * * * *